United States Patent
Bauer

(10) Patent No.: US 7,338,552 B2
(45) Date of Patent: Mar. 4, 2008

(54) PROCESS AND DEVICE FOR SEPARATING OIL AND VOLATILE ORGANIC COMPONENTS FROM PRESSURIZED GASES OF A COMPRESSION SYSTEM

(75) Inventor: Heinz Bauer, Munich (DE)

(73) Assignee: BAUER COMP Holding AG, Munich (DE)

( * ) Notice: Subject to any disclaimer, the term of this patent is extended or adjusted under 35 U.S.C. 154(b) by 258 days.

(21) Appl. No.: 11/122,225

(22) Filed: May 5, 2005

(65) Prior Publication Data
US 2005/0247199 A1  Nov. 10, 2005

(30) Foreign Application Priority Data
May 5, 2004  (DE)  ........................ 10 2004 022 090

(51) Int. Cl.
*B01D 45/00* (2006.01)
(52) U.S. Cl. ........................ 95/267; 55/319; 55/413; 55/417; 55/444; 55/DIG. 17; 422/176; 422/220
(58) Field of Classification Search .................. 55/413, 55/417, 444, DIG. 17; 95/267; 422/176, 422/177, 180, 222, 220
See application file for complete search history.

(56) References Cited

U.S. PATENT DOCUMENTS

| 3,905,729 | A | * | 9/1975 | Bauer | 418/84 |
| 3,955,945 | A | * | 5/1976 | Bauer | 55/319 |
| 4,388,086 | A | * | 6/1983 | Bauer et al. | 95/118 |
| 4,448,757 | A | * | 5/1984 | Barnwell et al. | 423/247 |
| 4,468,236 | A | * | 8/1984 | Bauer | 95/14 |
| 4,537,748 | A | * | 8/1985 | Billiet | 422/122 |
| 4,558,573 | A | * | 12/1985 | La Monica | 62/473 |
| 4,865,815 | A | * | 9/1989 | Martin et al. | 422/122 |
| 4,878,923 | A | * | 11/1989 | Muller | 55/355 |
| 5,158,585 | A | * | 10/1992 | Saho et al. | 55/319 |
| 5,330,723 | A | * | 7/1994 | Martin et al. | 422/122 |
| 2005/0092180 | A1 | * | 5/2005 | Fornof et al. | 95/278 |

FOREIGN PATENT DOCUMENTS

JP  408189490 A  *  7/1993

\* cited by examiner

*Primary Examiner*—Duane Smith
*Assistant Examiner*—Sonji Turner
(74) *Attorney, Agent, or Firm*—David S. Safran

(57) ABSTRACT

A process and device for separating oil and volatile organic components from pressurized gases of a compression system in which, before oxidation-catalytic separation, a physical separation is performed to protect the oxidation-catalytic separator against a large amount of oil being entrained in a surge in the pressurized gases. The resulting oil which has been separated in this physical oil separation is then fed back into the pressurized gas flow which is flowing to oxidation-catalytic separation in metered amounts. This results in the oil concentration in the pressurized gas entering the oxidation-catalytic separation means being maintained such that oxidation-catalytic separation can be carried out effectively and under optimum operating conditions without there being an adverse effect on operation by oil concentrations which are suddenly high for an instant.

8 Claims, 1 Drawing Sheet

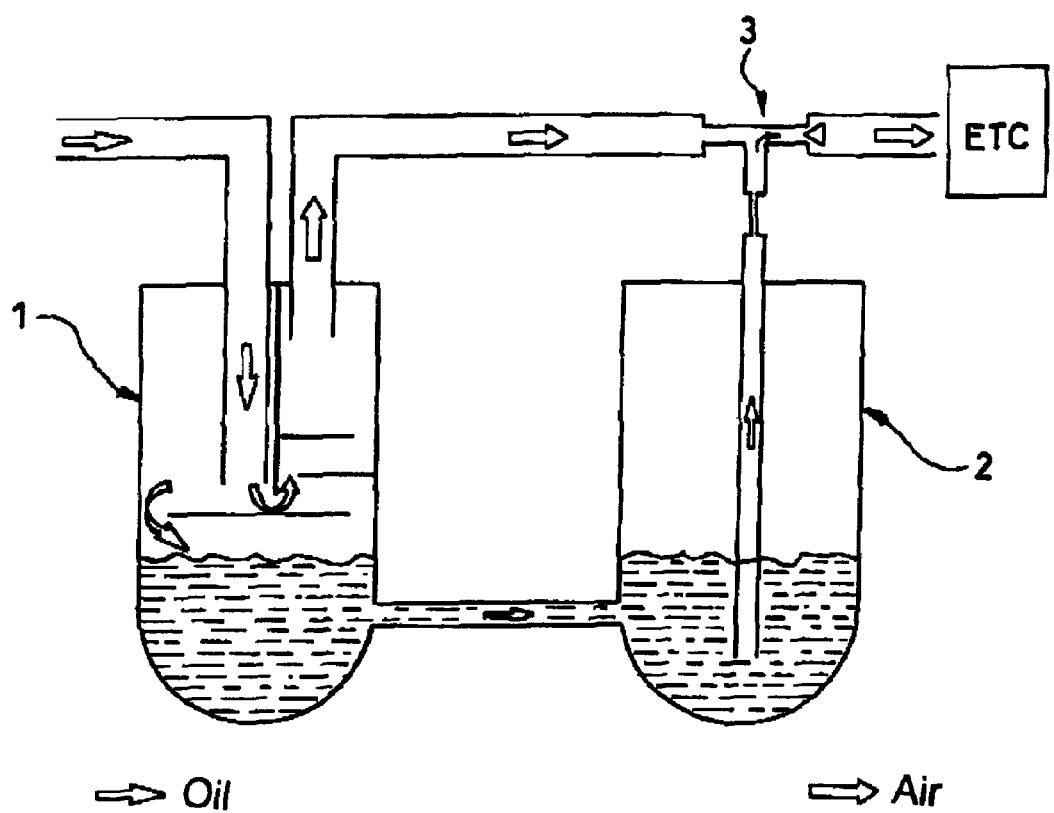

PROCESS AND DEVICE FOR SEPARATING OIL AND VOLATILE ORGANIC COMPONENTS FROM PRESSURIZED GASES OF A COMPRESSION SYSTEM

BACKGROUND OF THE INVENTION

1. Field of Invention

The invention relates to a process and device for separating oil and volatile organic components from pressurized gases of a compression system.

2. Description of Related Art

In more recent developments in the area of compressed air which is largely free of oil and condensates, as an example of a pressurized gas, the use of oxidation-catalytic separation of oil traces and volatile organic components from pressurized gases is known, so that a physical-chemical process is used. In compression systems, however, it happens that, for whatever reasons, large amounts of oil are suddenly entrained in batches in the compressed air flow which originates from the compression system. In this case, there is the danger that the oxidation-catalytic separation means are overtaxed, and thus, can no longer adequately convert large amounts of oil into water and other harmless air components. There is also the danger that the oxidation catalyst will be damaged, and thus, complete replacement of the oxidation-catalytic separation means becomes necessary; this is expensive and complex.

SUMMARY OF THE INVENTION

Therefore, the invention seeks to provide a process and device of the above mentioned type which offers effective protection against large entrained amounts of oil which arise in surges in the compressed air.

In accordance with the invention, on the one hand, a process for separation of oil and volatile organic components from pressurized gases of a compression system is provided in which oxidation-catalytic separation takes place, here, especially for large amounts of oil which are entrained in batches in the compressed air before oxidation-catalytic separation, non-chemical (physical) oil separation being undertaken, and that the separated oil which results is fed in metered form into the compressed air flow which is flowing to the oxidation-catalytic separation means.

Furthermore, in accordance with the invention, a device for separation of oil and volatile organic components from pressurized gases of a compression system is provided which has an oxidation-catalytic separation means, an oil separation means which does not work chemically (i.e., which works physically) and which is located upstream of the oxidation-catalytic separation means, and a means for metered injection of the separated oil into the pressurized gas flow (compressed air flow) which leads to the oxidation-catalytic separation means.

If, in the process and device of the invention, an oil surge is entrained in the pressurized gas flow which originates from the compression system, effective protection against damage of the oxidation-catalytic separation means is achieved in that, before catalytic separation, non-chemical or physical oil separation takes place. The separated oil which results is then again fed in a metered manner into the pressurized gas flow which leads to the oxidation-catalytic separation treatment. In this way, overloading and damage in the area of the oxidation-catalytic separation can be effectively avoided.

Other details, features, and advantages of the invention are described in detail in the following description of a preferred embodiment with reference to the accompanying drawings.

BRIEF DESCRIPTION OF THE DRAWINGS

The sole FIGURE of the drawings schematically shows a device for separation of oil and volatile organic components from pressurized gases of a compression system.

DETAILED DESCRIPTION OF THE INVENTION

As is shown schematically by arrows, a pressurized gas flow or compressed air flow which entrains oil and volatile organic components originates from a compression system. The compression system is not shown but can be formed by a conventional compression system which can be either of a single-stage or multi-stage type.

This pressurized gas flow (compressed air flow) in accordance with the invention is delivered into a non-chemically or physically operating oil separation means 1 upstream of an oxidation-catalytic separation means ETC. The oil separation means 1 is formed in the illustrated embodiment by a tank into which the oil-laden compressed air flow is delivered, and by the corresponding deflection, for example, by means of separating sheets, the oil is separated from the compressed air flow. This oil collects on the bottom area of the non-chemically operating oil separation means 1.

The oil sump on the bottom area of the oil separation means 1 is connected to communicate with a second tank 2 at its bottom area so that in the second tank 2 a predetermined amount of oil also collects on the bottom area. The compressed air flow from which oil has been separated by the oil separator 1, for example, leaves the first tank of the oil separation means on its top and is then routed to the oxidation-catalytic separation means ETC. The outlet of the second tank 2 has a metering means 3 for metered feeding of the oil which has been mechanically or physically separated beforehand into the compressed air flow which leads to the oxidation-catalytic separation means ETC. Metered oil feed can take place here in pulses or continuously. For metered oil feed, a solenoid valve or a nozzle can be provided. The metered oil feed can take place based on the differential pressure or according to the Venturi principle. After metered feeding of the oil into the compressed air flow, it is then routed to the oxidation-catalytic separation means ETC in which, in the conventional manner, oxidation-catalytic separation of oil and the volatile organic components takes place in a physical-chemical manner.

In summary, in accordance with the invention, a process and device for separating oil and volatile organic components from pressurized gases of a compression system are provided, in which, before oxidation-catalytic separation, non-chemical or physical separation is undertaken to protect the oxidation-catalytic separation treatment in the means intended for this purpose against a large amount of oil which may be entrained in a surge in the pressurized gases. The resulting oil which has been separated in this non-chemical or physical oil separation is then, in turn, fed in a metered manner into the pressurized gas flow which is flowing to the oxidation-catalytic separation. This results in the oil concentration in the pressurized gas being maintained before entering the oxidation-catalytic separation means such that oxidation-catalytic separation can be carried out effectively and under optimum operating conditions without there being an adverse effect on operation by oil concentrations which are suddenly high for an instant. Thus, the invention protects the oxidation-catalytic separation means against overload and damage.

What is claimed is:

1. Process for separating oil and volatile organic components from pressurized gases of a compression system having an oxidation-catalytic separation means (ETC) in which oxidation-catalytic separation of hydrocarbons and other oxidizable substances takes place, comprising the steps of:

separating out large amounts of oil which are entrained in the pressurized gas flow by physical oil separation in which pressurized gases are directed from said compression system into an oil separation means located upstream of said oxidation-catalytic separation means (ETC) that separates and collects oil and volatile organic components from said pressurized gases, and injecting all of said collected oil as well as condensate of said collected volatile organic components back into said pressurized gases at a point downstream of said oil separation means but upstream of said oxidation-catalytic separation means (ETC) to prevent overtaxing of said oxidation-catalytic separation means (ETC).

2. Device for separating oil and volatile organic components from pressurized gases of a compression system that produces a pressurized gas flow that leads into an oxidation-catalytic separation means (ETC), comprising:

a first oil separation means for physically separating out oil and volatile organic components from a flow of said pressurized gases, the oil separation means being connected upstream of the oxidation-catalytic separation means (ETC), wherein said oil separation means includes a first tank in communication with said pressurized gases that collects oil, and a second tank in communication with the collected oil of said first tank, and a metering means for feeding the separated and collected oil from the second tank of the oil separation means back into the pressurized gas flow in metered amounts downstream of the oil separation means and upstream of the oxidation-catalytic separation means (ETC) to prevent overtaxing of said oxidation-catalytic separation means (ETC).

3. Device as claimed in claim 2, wherein said metering means provides a continuous metered oil feed.

4. Device as claimed in claim 3, wherein said metering means comprises a nozzle.

5. Device as claimed in claim 2, wherein said metering means provides a pulsed metered oil feed.

6. Device as claimed in claim 5, wherein said metering means comprises a solenoid valve.

7. Device as claimed in claim 2, wherein metering means comprises a Venturi.

8. Device as claimed in claim 2, wherein said metering means includes a tube in said second tank of said oil separation means in communication with said collected oil for drawing collected oil to a solenoid valve or a nozzle.

* * * * *